(12) United States Patent
Liddiard et al.

(10) Patent No.: US 8,498,381 B2
(45) Date of Patent: Jul. 30, 2013

(54) POLYMER LAYER ON X-RAY WINDOW

(75) Inventors: Steven Liddiard, Springville, UT (US);
Brian Taylor, Provo, UT (US); Keith Decker, Pleasant Grove, UT (US); Jason Maynard, Draper, UT (US)

(73) Assignee: Moxtek, Inc., Orem, UT (US)

( * ) Notice: Subject to any disclaimer, the term of this patent is extended or adjusted under 35 U.S.C. 154(b) by 362 days.

(21) Appl. No.: 12/899,750

(22) Filed: Oct. 7, 2010

(65) Prior Publication Data
US 2012/0087476 A1 Apr. 12, 2012

(51) Int. Cl.
*G21K 1/00* (2006.01)
(52) U.S. Cl.
USPC ........................................................ 378/161
(58) Field of Classification Search
USPC ........................................................ 378/161
See application file for complete search history.

(56) References Cited

U.S. PATENT DOCUMENTS

| | | |
|---|---|---|
| 1,276,706 A | 5/1918 | Snook et al. |
| 1,881,448 A | 10/1932 | Forde et al. |
| 1,946,288 A | 2/1934 | Kearsley |
| 2,291,948 A | 8/1942 | Cassen |
| 2,316,214 A | 4/1943 | Atlee et al. |
| 2,329,318 A | 9/1943 | Atlee et al. |
| 2,340,363 A | 2/1944 | Atlee et al. |
| 2,502,070 A | 3/1950 | Atlee et al. |
| 2,683,223 A | 7/1954 | Hosemann |
| 2,952,790 A | 9/1960 | Steen |
| 3,397,337 A | 8/1968 | Denholm |
| 3,538,368 A | 11/1970 | Oess |
| 3,665,236 A | 5/1972 | Gaines et al. |
| 3,679,927 A | 7/1972 | Kirkendall |
| 3,691,417 A | 9/1972 | Gralenski |
| 3,741,797 A | 6/1973 | Chavasse, Jr. et al. |
| 3,751,701 A | 8/1973 | Gralenski et al. |
| 3,801,847 A | 4/1974 | Dietz |
| 3,828,190 A | 8/1974 | Dahlin et al. |
| 3,882,339 A | 5/1975 | Rate et al. |
| 3,962,583 A | 6/1976 | Holland et al. |
| 3,970,884 A | 7/1976 | Golden |
| 4,007,375 A | 2/1977 | Albert |
| 4,075,526 A | 2/1978 | Grubis |
| 4,160,311 A | 7/1979 | Ronde et al. |
| 4,178,509 A | 12/1979 | More et al. |
| 4,184,097 A | 1/1980 | Auge |

(Continued)

FOREIGN PATENT DOCUMENTS

| | | |
|---|---|---|
| DE | 1030936 | 5/1958 |
| DE | 4430623 | 3/1996 |

(Continued)

OTHER PUBLICATIONS

U.S. Appl. No. 12/239,281, filed Sep. 26, 2008; Robert C. Davis; office action issued Dec. 13, 2011.

(Continued)

*Primary Examiner* — Allen C. Ho
(74) *Attorney, Agent, or Firm* — Thorpe North & Western LLP

(57) ABSTRACT

An x-ray window comprising a plurality of thin film layers stacked together, including a thin film layer and a polymer layer. The thin film layer can be diamond, graphene, diamond-like carbon, beryllium, and combinations thereof. The polymer layer can be a polyimide. A boron hydride layer may also be included.

18 Claims, 3 Drawing Sheets

U.S. PATENT DOCUMENTS

| | | | |
|---|---|---|---|
| 4,293,373 A | 10/1981 | Greenwood | |
| 4,368,538 A | 1/1983 | McCorkle | |
| 4,393,127 A | 7/1983 | Greschner et al. | |
| 4,443,293 A | 4/1984 | Mallon et al. | |
| 4,463,257 A * | 7/1984 | Simpkins et al. | 250/310 |
| 4,463,338 A | 7/1984 | Utner et al. | |
| 4,521,902 A | 6/1985 | Peugeot | |
| 4,532,150 A | 7/1985 | Endo et al. | |
| 4,573,186 A | 2/1986 | Reinhold | |
| 4,576,679 A | 3/1986 | White | |
| 4,584,056 A | 4/1986 | Perret et al. | |
| 4,591,756 A | 5/1986 | Avnery | |
| 4,608,326 A | 8/1986 | Neukermans et al. | |
| 4,645,977 A | 2/1987 | Kurokawa et al. | |
| 4,675,525 A | 6/1987 | Amingual et al. | |
| 4,679,219 A | 7/1987 | Ozaki | |
| 4,688,241 A | 8/1987 | Peugeot | |
| 4,696,994 A | 9/1987 | Nakajima | |
| 4,705,540 A | 11/1987 | Hayes | |
| 4,777,642 A | 10/1988 | Ono | |
| 4,797,907 A | 1/1989 | Anderton | |
| 4,818,806 A | 4/1989 | Kunimune et al. | |
| 4,819,260 A | 4/1989 | Haberrecker | |
| 4,862,490 A | 8/1989 | Karnezos et al. | |
| 4,870,671 A | 9/1989 | Hershyn | |
| 4,876,330 A | 10/1989 | Higashi et al. | |
| 4,878,866 A | 11/1989 | Mori et al. | |
| 4,885,055 A | 12/1989 | Woodbury et al. | |
| 4,891,831 A | 1/1990 | Tanaka et al. | |
| 4,933,557 A | 6/1990 | Perkins | |
| 4,939,763 A | 7/1990 | Pinneo et al. | |
| 4,957,773 A | 9/1990 | Spencer et al. | |
| 4,960,486 A | 10/1990 | Perkins et al. | |
| 4,969,173 A | 11/1990 | Valkonet | |
| 4,979,198 A | 12/1990 | Malcolm et al. | |
| 4,979,199 A | 12/1990 | Cueman et al. | |
| 5,010,562 A | 4/1991 | Hernandez et al. | |
| 5,063,324 A | 11/1991 | Grunwald et al. | |
| 5,066,300 A | 11/1991 | Isaacson et al. | |
| 5,077,771 A | 12/1991 | Skillicorn et al. | |
| 5,077,777 A | 12/1991 | Daly | |
| 5,090,046 A | 2/1992 | Friel | |
| 5,105,456 A | 4/1992 | Rand et al. | |
| 5,117,829 A | 6/1992 | Miller et al. | |
| 5,153,900 A | 10/1992 | Nomikos et al. | |
| 5,161,179 A | 11/1992 | Suzuki et al. | |
| 5,173,612 A | 12/1992 | Imai et al. | |
| 5,217,817 A | 6/1993 | Verspui et al. | |
| 5,226,067 A * | 7/1993 | Allred et al. | 378/161 |
| RE34,421 E | 10/1993 | Parker et al. | |
| 5,258,091 A | 11/1993 | Imai et al. | |
| 5,267,294 A | 11/1993 | Kuroda et al. | |
| 5,302,523 A | 4/1994 | Coffee et al. | |
| 5,343,112 A | 8/1994 | Wegmann | |
| 5,391,958 A | 2/1995 | Kelly | |
| 5,392,042 A | 2/1995 | Pellon | |
| 5,400,385 A | 3/1995 | Blake et al. | |
| 5,422,926 A | 6/1995 | Smith et al. | |
| 5,428,658 A | 6/1995 | Oettinger et al. | |
| 5,432,003 A | 7/1995 | Plano et al. | |
| 5,469,429 A | 11/1995 | Yamazaki et al. | |
| 5,469,490 A | 11/1995 | Golden et al. | |
| 5,478,266 A | 12/1995 | Kelly | |
| 5,521,851 A | 5/1996 | Wei et al. | |
| 5,524,133 A | 6/1996 | Neale et al. | |
| RE35,383 E | 11/1996 | Miller et al. | |
| 5,571,616 A | 11/1996 | Phillips et al. | |
| 5,578,360 A * | 11/1996 | Viitanen | 428/138 |
| 5,602,507 A | 2/1997 | Suzuki | |
| 5,607,723 A | 3/1997 | Plano et al. | |
| 5,621,780 A | 4/1997 | Smith et al. | |
| 5,627,871 A | 5/1997 | Wang | |
| 5,631,943 A | 5/1997 | Miles | |
| 5,673,044 A | 9/1997 | Pellon | |
| 5,680,433 A | 10/1997 | Jensen | |
| 5,682,412 A | 10/1997 | Skillicorn et al. | |
| 5,696,808 A | 12/1997 | Lenz | |
| 5,706,354 A | 1/1998 | Stroehlein | |
| 5,729,583 A | 3/1998 | Tang et al. | |
| 5,740,228 A * | 4/1998 | Schmidt et al. | 378/161 |
| 5,774,522 A | 6/1998 | Warburton | |
| 5,812,632 A | 9/1998 | Schardt et al. | |
| 5,835,561 A | 11/1998 | Moorman et al. | |
| 5,870,051 A | 2/1999 | Warburton | |
| 5,898,754 A | 4/1999 | Gorzen | |
| 5,907,595 A | 5/1999 | Sommerer | |
| 6,002,202 A | 12/1999 | Meyer et al. | |
| 6,005,918 A | 12/1999 | Harris et al. | |
| 6,044,130 A | 3/2000 | Inazura et al. | |
| 6,062,931 A | 5/2000 | Chuang et al. | |
| 6,063,629 A | 5/2000 | Knoblauch | |
| 6,069,278 A | 5/2000 | Chuang | |
| 6,073,484 A | 6/2000 | Miller et al. | |
| 6,075,839 A | 6/2000 | Treseder | |
| 6,097,790 A | 8/2000 | Hasegawa et al. | |
| 6,129,901 A | 10/2000 | Moskovits et al. | |
| 6,133,401 A | 10/2000 | Jensen | |
| 6,134,300 A | 10/2000 | Trebes et al. | |
| 6,184,333 B1 | 2/2001 | Gray | |
| 6,205,200 B1 | 3/2001 | Boyer et al. | |
| 6,277,318 B1 | 8/2001 | Bower | |
| 6,282,263 B1 | 8/2001 | Arndt et al. | |
| 6,288,209 B1 | 9/2001 | Jensen | |
| 6,307,008 B1 | 10/2001 | Lee et al. | |
| 6,320,019 B1 | 11/2001 | Lee et al. | |
| 6,351,520 B1 | 2/2002 | Inazaru | |
| 6,385,294 B2 | 5/2002 | Suzuki et al. | |
| 6,388,359 B1 | 5/2002 | Duelli et al. | |
| 6,438,207 B1 | 8/2002 | Chidester et al. | |
| 6,477,235 B2 | 11/2002 | Chornenky et al. | |
| 6,487,272 B1 | 11/2002 | Kutsuzawa | |
| 6,487,273 B1 | 11/2002 | Takenaka et al. | |
| 6,494,618 B1 | 12/2002 | Moulton | |
| 6,546,077 B2 | 4/2003 | Chornenky et al. | |
| 6,567,500 B2 | 5/2003 | Rother | |
| 6,645,757 B1 | 11/2003 | Okandan et al. | |
| 6,646,366 B2 | 11/2003 | Hell et al. | |
| 6,658,085 B2 | 12/2003 | Sklebitz | |
| 6,661,876 B2 | 12/2003 | Turner et al. | |
| 6,740,874 B2 | 5/2004 | Doring | |
| 6,778,633 B1 | 8/2004 | Loxley et al. | |
| 6,799,075 B1 | 9/2004 | Chornenky et al. | |
| 6,803,570 B1 | 10/2004 | Bryson, III et al. | |
| 6,816,573 B2 | 11/2004 | Hirano et al. | |
| 6,819,741 B2 | 11/2004 | Chidester | |
| 6,838,297 B2 | 1/2005 | Iwasaki | |
| 6,852,365 B2 | 2/2005 | Smart et al. | |
| 6,866,801 B1 | 3/2005 | Mau et al. | |
| 6,876,724 B2 | 4/2005 | Zhou | |
| 6,900,580 B2 | 5/2005 | Dai et al. | |
| 6,956,706 B2 | 10/2005 | Brandon | |
| 6,962,782 B1 | 11/2005 | Livache et al. | |
| 6,976,953 B1 | 12/2005 | Pelc | |
| 6,987,835 B2 | 1/2006 | Lovoi | |
| 7,035,379 B2 * | 4/2006 | Turner et al. | 378/140 |
| 7,046,767 B2 | 5/2006 | Okada et al. | |
| 7,049,735 B2 | 5/2006 | Ohkubo et al. | |
| 7,075,699 B2 | 7/2006 | Oldham et al. | |
| 7,085,354 B2 | 8/2006 | Kanagami | |
| 7,108,841 B2 | 9/2006 | Smally | |
| 7,130,380 B2 | 10/2006 | Lovoi et al. | |
| 7,130,381 B2 | 10/2006 | Lovoi et al. | |
| 7,189,430 B2 | 3/2007 | Ajayan et al. | |
| 7,203,283 B1 | 4/2007 | Puusaari | |
| 7,206,381 B2 | 4/2007 | Shimono et al. | |
| 7,215,741 B2 | 5/2007 | Ukita | |
| 7,224,769 B2 | 5/2007 | Turner | |
| 7,233,071 B2 | 6/2007 | Furukawa et al. | |
| 7,233,647 B2 | 6/2007 | Turner et al. | |
| 7,286,642 B2 | 10/2007 | Ishikawa et al. | |
| 7,305,066 B2 | 12/2007 | Ukita | |
| 7,358,593 B2 | 4/2008 | Smith et al. | |
| 7,382,862 B2 | 6/2008 | Bard et al. | |
| 7,428,298 B2 | 9/2008 | Bard et al. | |
| 7,448,801 B2 | 11/2008 | Oettinger et al. | |
| 7,448,802 B2 | 11/2008 | Oettinger et al. | |
| 7,486,774 B2 | 2/2009 | Cain | |

| | | |
|---|---|---|
| 7,526,068 B2 | 4/2009 | Dinsmore |
| 7,529,345 B2 | 5/2009 | Bard et al. |
| 7,618,906 B2 | 11/2009 | Meilahti |
| 7,634,052 B2 | 12/2009 | Grodzins |
| 7,649,980 B2 | 1/2010 | Aoki et al. |
| 7,650,050 B2 | 1/2010 | Haffner et al. |
| 7,657,002 B2 | 2/2010 | Burke et al. |
| 7,680,652 B2 | 3/2010 | Giesbrecht et al. |
| 7,684,545 B2 * | 3/2010 | Damento et al. ............ 378/161 |
| 7,693,265 B2 | 4/2010 | Hauttmann et al. |
| 7,709,820 B2 | 5/2010 | Decker et al. |
| 7,737,424 B2 * | 6/2010 | Xu et al. .................... 250/505.1 |
| 7,756,251 B2 | 7/2010 | Davis et al. |
| 2002/0075999 A1 | 6/2002 | Rother |
| 2002/0094064 A1 | 7/2002 | Zhou |
| 2003/0096104 A1 | 5/2003 | Tobita et al. |
| 2003/0117770 A1 | 6/2003 | Montgomery et al. |
| 2003/0122111 A1 | 7/2003 | Glatkowski |
| 2003/0152700 A1 | 8/2003 | Asmussen et al. |
| 2003/0165418 A1 | 9/2003 | Ajayan et al. |
| 2004/0076260 A1 | 4/2004 | Charles, Jr. et al. |
| 2005/0018817 A1 | 1/2005 | Oettinger et al. |
| 2005/0141669 A1 | 6/2005 | Shimono et al. |
| 2005/0207537 A1 | 9/2005 | Ukita |
| 2006/0073682 A1 | 4/2006 | Furukawa et al. |
| 2006/0098778 A1 | 5/2006 | Oettinger et al. |
| 2006/0233307 A1 | 10/2006 | Dinsmore |
| 2006/0269048 A1 | 11/2006 | Cain |
| 2007/0025516 A1 | 2/2007 | Bard et al. |
| 2007/0087436 A1 | 4/2007 | Miyawaki et al. |
| 2007/0111617 A1 | 5/2007 | Meilahti |
| 2007/0133921 A1 | 6/2007 | Haffner et al. |
| 2007/0142781 A1 | 6/2007 | Sayre |
| 2007/0165780 A1 | 7/2007 | Durst et al. |
| 2007/0183576 A1 | 8/2007 | Burke et al. |
| 2008/0199399 A1 | 8/2008 | Chen et al. |
| 2008/0296479 A1 | 12/2008 | Anderson et al. |
| 2008/0296518 A1 | 12/2008 | Xu et al. |
| 2008/0317982 A1 | 12/2008 | Hecht |
| 2009/0085426 A1 | 4/2009 | Davis et al. |
| 2009/0086923 A1 | 4/2009 | Davis et al. |
| 2010/0126660 A1 | 5/2010 | O'Hara |
| 2010/0239828 A1 | 9/2010 | Cronaby et al. |
| 2010/0243895 A1 | 9/2010 | Xu et al. |
| 2010/0248343 A1 | 9/2010 | Aten et al. |
| 2010/0285271 A1 | 11/2010 | Davis et al. |
| 2010/0323419 A1 | 12/2010 | Aten et al. |

FOREIGN PATENT DOCUMENTS

| | | |
|---|---|---|
| DE | 19818057 | 11/1999 |
| EP | 0297808 | 1/1989 |
| EP | 0330456 | 8/1989 |
| GB | 1252290 | 11/1971 |
| JP | 57082954 | 8/1982 |
| JP | 3170673 | 7/1991 |
| JP | 05066300 | 3/1993 |
| JP | 5135722 | 6/1993 |
| JP | 06119893 | 7/1994 |
| JP | 6289145 | 10/1994 |
| JP | 6343478 | 12/1994 |
| JP | 8315783 | 11/1996 |
| JP | 2003/007237 | 1/2003 |
| JP | 2003/088383 | 3/2003 |
| JP | 2003510236 | 3/2003 |
| JP | 2003/3211396 | 7/2003 |
| JP | 4171700 | 6/2006 |
| JP | 2006297549 | 11/2006 |
| KR | 10-2005-0107094 | 11/2005 |
| WO | WO 96-19738 | 6/1996 |
| WO | WO99/65821 | 12/1999 |
| WO | WO00/09443 | 2/2000 |
| WO | WO00/17102 | 3/2000 |
| WO | WO03/076951 | 9/2003 |
| WO | WO 2008/052002 | 5/2008 |
| WO | WO 2009/009610 | 1/2009 |
| WO | WO 2009/045915 | 4/2009 |
| WO | WO 2009/085351 | 7/2009 |
| WO | WO 2010/107600 | 9/2010 |

OTHER PUBLICATIONS

U.S. Appl. No. 12/814,912, filed Jun. 14, 2010; Degao Xu; office action issued Dec. 5, 2011.

Vajtai et al; Building Carbon Nanotubes and Their Smart Architectures; Smart Mater. Struct. 2002; pp. 691-698; vol. 11.

PCT Application PCT/US2011/046371; filed Aug. 3, 2011; Steven Liddiard; International Search Report mailed Feb. 29, 2012.

Anderson et al., U.S. Appl. No. 11/756,962, filed Jun. 1, 2007.

Barkan et al., "Improved window for low-energy x-ray transmission a Hybrid design for energy-dispersive microanalysis," Sep. 1995, 2 pages, Ectroscopy 10(7).

Blanquart et al.; "XPAD, a New Read-out Pixel Chip for X-ray Counting"; IEEE Xplore; Mar. 25, 2009.

Chen, Xiaohua et al., "Carbon-nanotube metal-matrix composites prepared by electroless plating," Composites Science and Technology, 2000, pp. 301-306, vol. 60.

Comfort, J. H., "Plasma-enhanced chemical vapor deposition of in situ doped epitaxial silicon at low temperatures," J. Appl. Phys. 65, 1067 (1989).

Das, D. K., and K. Kumar, "Chemical vapor deposition of boron on a beryllium surface," Thin Solid Films, 83(1), 53-60.

Das, K., and Kumar, K., "Tribological behavior of improved chemically vapor-deposited boron on beryllium," Thin Solid Films, 108(2), 181-188.

Flahaut, E. et al, "Carbon Nanotube-metal-oxide nanocomposites; microstructure, electrical conductivity and mechanical properties," Acta mater., 2000, pp. 3803-3812.Vo. 48.

Gevin, et al IDe-XV1.0: Performances of a New CMOS Multi channer Analogue Readout ASIC for Cd (Zn) Te Detectors; IEEE 2005.

Grybos et al.; "DEDIX—Development of Fully Integrated Multichannel ASIC for High Count Rate Digital X-ray Imagining systems"; IEEE 2006; Nuclear Science Symposium Conference Record.

Grybos, "Pole-Zero Cancellations Circuit With Pulse Pile-Up Tracking System for Low Noise Charge-Sensitive Amplifiers"; Mar. 25, 2009; from IEEE Xplore.

Grybos, et al "Measurements of Matching and High Count Rate Performance of Multichannel ASIC for Digital X-Ray Imaging Systems"; IEEE Transactions on Nuclear Science, vol. 54, No. 4, 2007.

Hanigofsky, J. A., K. L. More, and W. J. Lackey, "Composition and microstructure of chemically vapor-deposited boron nitride, aluminum nitride, and boron nitride + aluminum nitride composites," J. Amer. Ceramic Soc. 74, 301 (1991).

hhtp://www.orau.org/ptp/collection/xraytubescollidge/MachelettCW250.htm, 1999, 2 pgs.

http://www.orau.org/ptp/collectio/xraytubescollidge/MachlettCW250T.htm, 1999, 2 pages.

Hutchison, "Vertically aligned carbon nanotubes as a framework for microfabrication of high aspect ration mems," 2008, pp. 1-50.

Jiang, et al; "Carbon nanotubes-metal nitride composites: a new class of nanocomposites with enhanced electrical properties"; Jun. 25, 2004 ; J. Mater. Chem, 2005.

Jiang, Linquin et al., "Carbon nanotubes-metal nitride composites; a new class of nanocomposites with enhanced electrical properties," J. Mater. Chem., 2005, pp. 260-266, vol. 15.

Komatsu, S., and Y. Moriyoshi, "Influence of atomic hydrogen on the growth reactions of amorphous boron films in a low-pressure $B_2H_6$ +He+$H_2$ plasma", J. Appl. Phys. 64, 1878 (1988).

Komatsu, S., and Y. Moriyoshi, "Transition from amorphous to crystal growth of boron films in plasma-enhanced chemical vapor deposition with $B_2H_6$ +He," J. Appl. Phys., 66, 466 (1989).

Komatsu, S., and Y. Moriyoshi, "Transition from thermal-to electron-impact decomposition of diborane in plasma-enhanced chemical vapor deposition of boron films from $B_2H_6$ +He," J. Appl. Phys. 66, 1180 (1989).

Lee, W., W. J. Lackey, and P. K. Agrawal, "Kinetic analysis of chemical vapor deposition of boron nitride," J. Amer. Ceramic Soc. 74, 2642 (1991).

Li, Jun et al., "Bottom-up approach for carbon nanotube interconnects," Applied Physics Letters, Apr. 14, 2003, pp. 2491-2493, vol. 82 No. 15.
Lines, U.S. Appl. No. 12/352,864, filed Jan. 13, 2009.
Lines, U.S. Appl. No. 12/726,120, filed Mar. 17, 2010.
Ma. R.Z., et al., "Processing and properties of carbon nanotubes-nano-SIC ceramic", Journal of Materials Science 1998, pp. 5243-5246, vol. 33.
Maya, L., and L. A. Harris, "Pyrolytic deposition of carbon films containing nitrogen and/or boron," J. Amer. Ceramic Soc. 73, 1912 (1990).
Michaelidis, M., and R. Pollard, "Analysis of chemical vapor deposition of boron," J. Electrochem. Soc. 132, 1757 (1985).
Micro X-ray Tube Operation Manual, X-ray and Specialty Instruments Inc., 1996, 5 pages.
Micro X-Ray Tubem Operation Manual, X-ray and Speciality Instruments, Inc., 1996, 5 pgs.
Moore, A. W., S. L. Strong, and G. L. Doll, "Properties and characterization of codeposited boron nitride and carbon materials," J. Appl. Phys. 65, 5109 (1989).
Nakamura, K., "Preparation and properties of amorphous boron nitride films by molecular flow chemical vapor deposition," J. Electrochem. Soc. 132, 1757 (1985).
Panayiotatos, et al., "Mechanical performance and growth characteristics of boron nitride films with respect to their optical, compositional properties and density," Surface and Coatings Technology, 151-152 (2002) 155-159.
PCT Application PCT/US08/65346; filed May 30, 2008; Keith Decker.
PCT Application PCT/US10/56011; filed Nov. 9, 2010; Krzysztof Kozaczek.
Peigney, et al., "Carbon nanotubes in novel ceramic matrix nanocomposites," Ceramics International, 2000, pp. 677-683, vol. 26.
Perkins, F. K., R. A. Rosenberg, and L. Sunwoo, "Synchrotronradiation deposition of boron and boron carbide films from boranes and carboranes: decaborane," J. Appl. Phys. 69,4103 (1991).
Powell et al., "Metalized polyimide filters for x-ray astronomy and other applications," SPIE, pp. 432-440, vol. 3113.
Rankov. A. "A Novel Correlated Double Sampling Poly-Si Circuit for Readout System in Large Area X-Ray Sensors", 2005.
Roca i Cabarrocas, P., S. Kumar, and B. Drevillon, "In situ study of the thermal decomposition of $B_2H_6$ by combining spectroscopic ellipsometry and Kelvin probe measurements," J. Appl. Phys. 66, 3286 (1989).
Satishkumar B.C., et al. "Synthesis of metal oxide nanorods using carbon nanotubes as templates," Journal of Materials Chemistry, 2000, pp. 2115-2119, vol. 10.
Scholze et al., "Detection efficiency of energy-dispersive detectors with low-energy windows" X-Ray Spectrometry, X-Ray Spectrom, 2005: 34: 473-476.
Sheather Journal Physil 1973, pp. 319-322, vol. 6, No. 4.
Sheather, "The support of thin windows for x-ray proportional counters," Journal Phys,E., Apr. 1973, pp. 319-322, vol. 6, No. 4.
Shirai, K., S.-I. Gonda, and S. Gonda, "Characterization of hydrogenated amorphous boron films prepared by electron cyclotron resonance plasma chemical vapor deposition method," J. Appl. Phys. 67, 6286 (1990).
Tamura, et al "Developmenmt of ASICs for CdTe Pixel and Line Sensors", IEEE Transactions on Nuclear Science, vol. 52, No. 5, Oct. 2005.
Tien-Hui Lin et al., "An investigation on the films used as teh windows of ultra-soft X-ray counters." Acta Physica Sinica, vol. 27, No. 3, pp. 276-283, May 1978, abstract only.
U.S. Appl. No. 12/640,154, filed Dec. 17, 2009; Krzysztof Kozaczek.
U.S. Appl. No. 12/726,120, filed Mar. 17, 2010; Michael Lines.
U.S. Appl. No. 12/783,707, filed May 20, 2010; Steven D. Liddiard.
U.S. Appl. No. 13/018,667, filed Feb. 1, 2011; Lei Pei.
Vandenbulcke, L. G., "Theoretical and experimental studies on the chemical vapor deposition of boron carbide," Indust. Eng. Chem. Prod. Res. Dev. 24, 568 (1985).
Viitanen Veli-Pekka et al., Comparison of Ultrathin X-Ray Window Designs, presented at the Soft X-rays in the 21st Century Conference held in Provo, utah Feb. 10-13, 1993, pp. 182-190.
Wagner et al, "Effects of Scatter in Dual-Energy Imaging: An Alternative Analysis"; IEEE; Sep. 1989, vol. 8. No. 3.
Winter, J., H. G. Esser, and H. Reimer, "Diborane-free boronization," Fusion Technol. 20, 225 (1991).
www.moxtek,com, Moxtek, Sealed Proportional Counter X-Ray Windows, Oct. 2007, 3 pages.
www.moxtek.com, Moxtek, AP3 Windows, Ultra-thin Polymer X-Ray Windows, Sep. 2006, 2 pages.
www.moxtek.com, Moxtek, DuraBeryllium X-Ray Windows, May 2007, 2 pages.
www.moxtek.com, Moxtek, ProLine Series 10 Windows, Ultra-thin Polymer X-Ray Windows, Sep. 2006, 2 pages.
www.moxtek.com, X-Ray Windows, ProLINE Series 20 Windows Ultra-thin Polymer X-ray Windows, 2 pages. Applicant believes that this product was offered for sale prior to the filing date of applicant's application.
Yan, Xing-Bin, et al., Fabrications of Three-Dimensional ZnO-Carbon Nanotube (CNT) Hybrids Using Self-Assembled CNT Micropatterns as Framework, 2007. pp. 17254-17259, vol. III.
U.S. Appl. No. 12/640,154, filed Dec. 17, 2009; Krzysztof Kozaczek; office action issued Apr. 26, 20111.
U.S. Appl. No. 12/640,154, filed Dec. 17, 2009; Krzysztof Kozaczek; office action issued Jun. 9, 2011.
U.S. Appl. No. 12/407,457, filed Mar. 19, 2009; Sterling W. Cornaby; office action issued Jun. 14, 2011.
U.S. Appl. No. 12/640,154, filed Dec. 17, 2009; Krzysztof Kozaczek; notice of allowance issued May 23, 2011.
U.S. Appl. No. 12/239,302, filed Sep. 26, 2008; Robert C. Davis; office action issued May 26, 2011.
Vajtai et al.; Building Carbon Nanotubes and Their Smart Architectures; Smart Mater. Struct.; 2002; pp. 691-698; vol. 11.
U.S. Appl. No. 12/783,707, filed May 20, 2010; Steven D. Liddiard; office action issued Jun. 22, 2012.
U.S. Appl. No. 13/018,667, filed Feb. 1, 2011; Robert C. Davis; office action issued Apr. 26, 2012.
U.S. Appl. No. 12/239,281, filed Sep. 26, 2008; Robert C. Davis; office action issued May 24, 2012.
U.S. Appl. No. 13/209,862, filed Aug. 15, 2011; Sterling W. Cornaby; notice of allowance issued Oct. 9, 2012.
PCT Application PCT/US2010/056011; filed Nov. 9, 2010; Krzysztof Kozaczek; International Search Report mailed Jul. 13, 2011.
Chakrapani et al.; Capillarity-Driven Assembly of Two-Dimensional Cellular Carbon Nanotube Foams; PNAS; Mar. 23, 2004; pp. 4009-4012; vol. 101; No. 12.
Nakajima et al.; Trial Use of Carbon-Fiber-Reinforced Plastic as a Non-Bragg Window Material of X-Ray Transmission; Rev. Sci. Instrum.; Jul. 1989; pp. 2432-2435 ; vol. 60; No. 7.
U.S. Appl. No. 12/783,707, filed May 20, 2010; Steven D. Liddiard; office action dated Sep. 20, 2012.
U.S. Appl. No. 13/018,667, filed Feb. 1, 2011; Robert C. Davis; office action dated Oct. 2, 2012.

* cited by examiner

POLYMER LAYER ON X-RAY WINDOW

BACKGROUND

X-ray windows are designed to allow penetration of x-rays, even low energy x-rays. Desirable characteristics of x-ray windows include (1) minimal x-ray attenuation, (2) gas impenetrability, in order to maintain a vacuum on one side and perhaps ambient air on the other side, (3) corrosion resistance, (4) the ability to withstand high temperatures, and (5) high strength to withstand a pressure differential of at least one atmosphere.

Chemical vapor deposited poly(p-xylylene) polymers, known as parylene, has been used on top of a thin film of a beryllium x-ray window for corrosion protection. It would be beneficial to have an x-ray window that has improved corrosion resistance and improved ability to withstand higher temperatures than x-ray windows with a parylene coating on top of beryllium.

Boron hydride, known by Moxtek's trademark Dura-Coat®, has been used on top of a thin film of a beryllium x-ray window for corrosion protection. It would be beneficial to have an x-ray window that has improved gas impenetrability and improved corrosion resistance than x-ray windows with a boron hydride coating on top of beryllium.

SUMMARY

It has been recognized that it would be advantageous to provide an x-ray window x-ray that has improved gas impenetrability, improved corrosion resistance, and improved ability to withstand higher temperatures. The present invention is directed to an x-ray window comprising a plurality of layers stacked together, including a thin film layer and a polymer layer. The thin film layer can be diamond, graphene, diamond-like carbon, beryllium, and combinations thereof. The polymer layer can be a polyimide. A boron hydride layer may also be one of the plurality of layers. A polymer layer and a boron hydride layer can provide improved gas impenetrability and improved corrosion resistance to the thin film layer. Depending on the polymer selected, the x-ray window may be subjected to higher temperatures without breakdown.

DEFINITIONS

Figure 1:
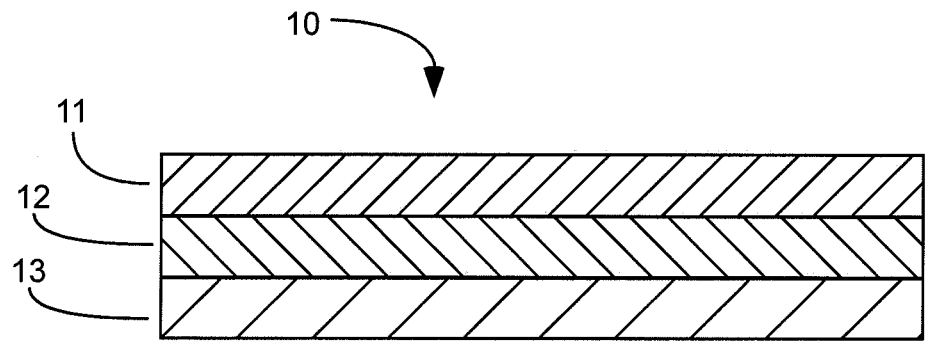
FIG. 1 is a schematic cross-sectional side view of an x-ray window in accordance with an embodiment of the present invention.

As used in this description and in the appended claims, the word "film" or "layer" means a continuous layer and does not mean a divided structural support such as a plurality of ribs.

As used in this description and in the appended claims, the word "boron hydride layer" means a layer comprising boron hydride but may also include other materials.

As used in this description and in the appended claims, the word "polymer layer" means a layer comprising a polymer but may also include other materials.

As used in this description and in the appended claims, the word "polyimide layer" means a layer comprising polyimide but may also include other materials.

As used in this description and in the appended claims, the word "beryllium layer" means a layer comprising beryllium but may also include other materials.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIG. 1, an x-ray window 10 is shown comprising a plurality of layers 11-13 stacked together, including a thin film layer, a boron hydride layer, and a polymer layer. The thin film layer can comprise a material selected from the group consisting of diamond, graphene, diamond-like carbon, beryllium, and combinations thereof. The x-ray window 10 or layers 11-13 can be substantially transmissive to x-rays having an energy in the range of 100-20,000 electronvolts. Thus, the layers may be sufficiently thin and the layers may be of a material that is substantially transmissive to x-rays. The layers may be disposed in any order such that boron hydride, the thin film layer, or the polymer layer may be disposed between the other two layers. In one aspect, the boron hydride layer 12 can be between the thin film layer 11 and the polymer layer 13. In another aspect, the thin film layer 12 can be between the boron hydride layer 11 and the polymer layer 13. In another aspect, the polymer layer 12 can be between the thin film layer 11 and the boron hydride layer 13.

Beryllium, diamond, graphene, and diamond-like carbon may be selected for x-ray window films due to low atomic numbers of these materials and due to their strength. Boron hydride may be selected for its corrosion resistance properties and its resistance to high temperatures. The use of boron hydride on x-ray windows is described in U.S. Pat. No. 5,226,067, which is incorporated herein by reference. A polymer layer may be added to an x-ray window comprising boron hydride on a thin film in order to improve the corrosion resistance and gas impenetrability of the window.

In one embodiment, the x-ray window or layers may be capable of withstanding a differential pressure of at least 1 atmosphere and capable of withstanding temperatures of greater than 350° C. Use of high temperature polymers, such as a polyimide for the polymer layer, can allow the x-ray window or layers to withstand high temperatures. Use of sufficiently thick layers of materials can allow the window or layers to withstand a differential pressure of at least 1 atmosphere.

In one embodiment, the thin film layer has a thickness of about 5 to 500 micrometers, the boron hydride layer has a thickness of about 20 to 2000 nanometers, and the polymer layer has a thickness of about 50 to 1200 nanometers. In another embodiment, the thin film layer has a thickness of about 5 to 12 micrometers, the boron hydride layer has a thickness of about 800 to 1600 nanometers, and the polymer layer has a thickness of about 20 to 300 nanometers. In another embodiment, the thin film layer has a thickness of about 50 to 1200 nanometers, the boron hydride layer has a thickness of about 20 to 2000 nanometers, and the polymer layer has a thickness of about 50 to 1200 nanometers. Thicknesses of the layers may be selected according to desired window strength, level of corrosion resistance desired, level of gas impenetrability desired, ease of manufacturing, and for minimal x-ray attenuation. The above thickness combinations are believed to provide the desired performance.

Figure 2:
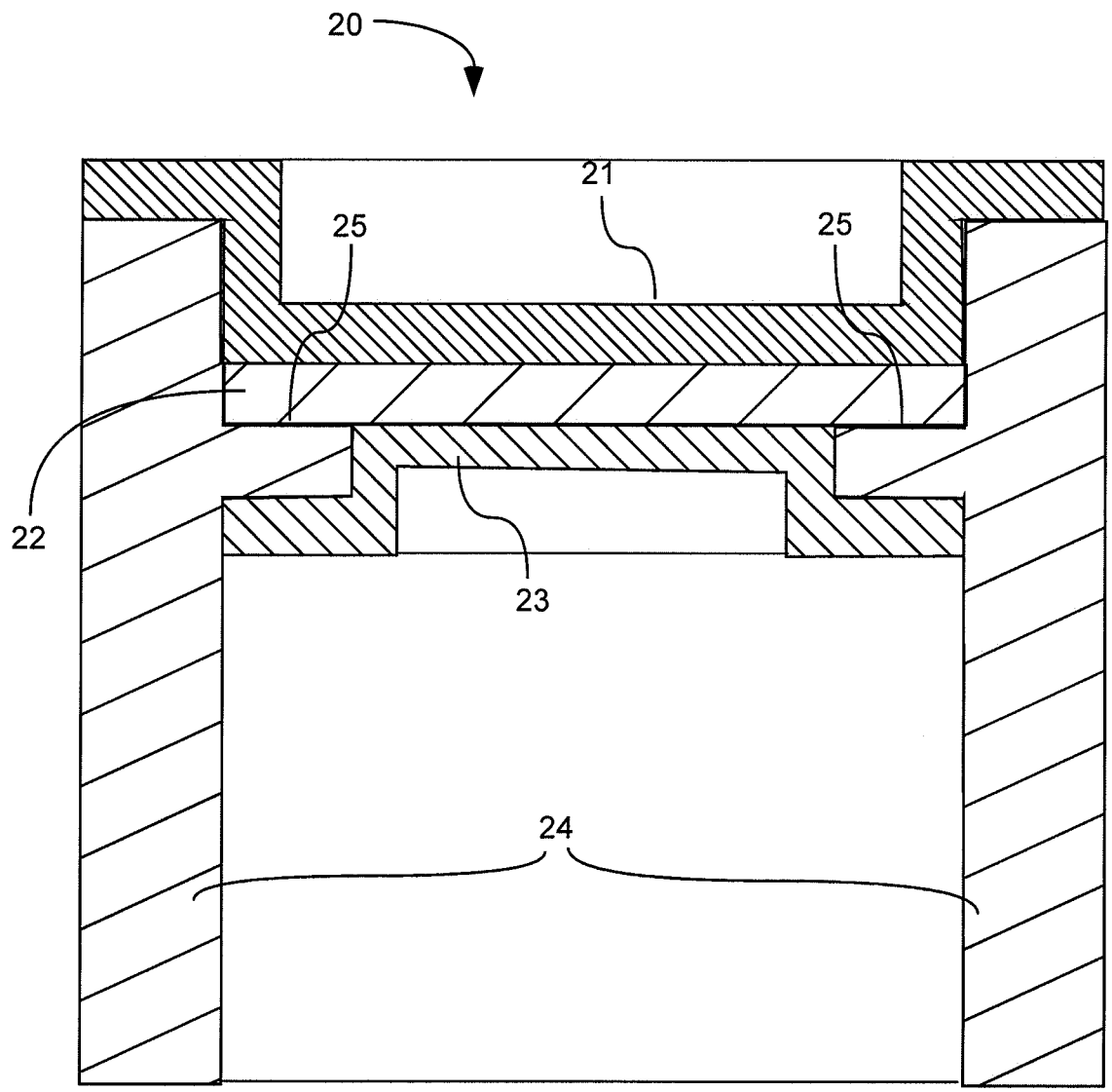
FIG. 2 is a schematic cross-sectional side view of an x-ray window attached to a mount in accordance with an embodiment of the present invention.

As shown in FIG. 2, an x-ray window 20 may be sealed to a mount 24. The mount can be a cylinder with a bore therethrough and an internal annular flange or lip to support the window or layers. A thin film layer 22 can be hermetically sealed to the mount 24, such as the annular flange or lip, at a perimeter of the thin film layer 22 defining a sealed joint 25. The thin film layer 22 may be sealed to the mount by an adhesive, brazing, diffusion bonding, or soldering. A boron hydride layer and a polymer layer, shown together as layer 21 in FIG. 2, can extend beyond the perimeter of the thin film layer 22, and over the sealed joint and onto the mount, thus providing corrosion protection to the sealed joint 25. The boron hydride layer may be disposed between the thin film layer 22 and the polymer layer, or the polymer layer may be disposed between the thin film layer 22 and the boron hydride layer. The boron hydride layer and polymer layer, shown together as layer 21 in FIG. 2, may be called a first boron hydride layer and a first polymer layer.

Also shown in FIG. 2, a second boron hydride layer 23 can be disposed on an opposite side of the thin film layer 22 from the first boron hydride layer and first polymer layer 21. The second boron hydride layer 23 can extend beyond the perimeter of the thin film layer 22 and onto the mount or annular flange or lip to cover the sealed joint 25, and the second boron hydride layer can provide corrosion protection to the sealed joint.

The second boron hydride layer 23 may further comprise a second polymer layer. The second polymer layer can be disposed on an opposite side of the thin film layer 22 from the first polymer layer. The second polymer layer can extend beyond the perimeter of the thin film layer to cover the sealed joint 25. The second polymer layer can provide corrosion protection to the sealed joint. The second boron hydride layer may be disposed between the thin film layer 22 and the second polymer layer, or the second polymer layer may be disposed between the thin film layer 22 and the second boron hydride layer.

Figure 3:
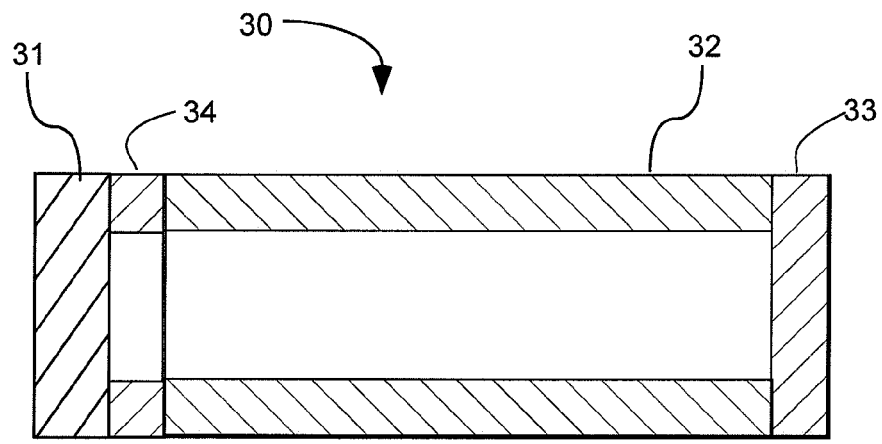
FIG. 3 is a schematic cross-sectional side view of an x-ray window attached to an x-ray tube in accordance with an embodiment of the present invention.

As shown in FIG. 3, various embodiments, shown generally at 30, of the x-ray window 31 described herein may be mounted on an x-ray tube 32, thus forming a hermetically tight enclosure. The x-ray tube can be a cylinder closed at both ends to form a vacuum, and with a cathode element and cathode 33 at one end, and with an anode 34 and the window 31 at the opposite end.

Figure 4:
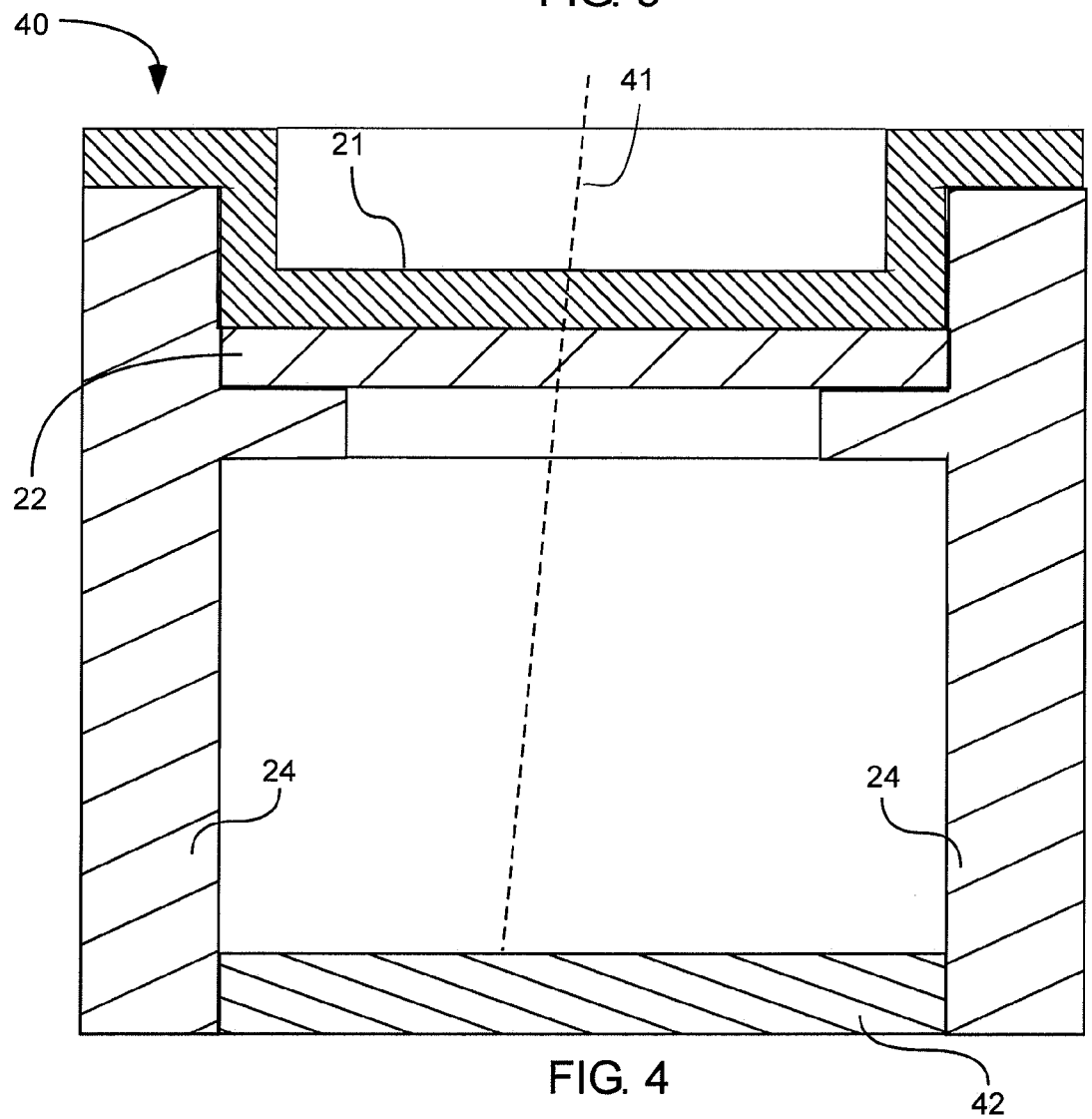
FIG. 4 is a schematic cross-sectional side view of an x-ray window attached to an x-ray detector in accordance with an embodiment of the present invention.

As shown in FIG. 4, various embodiments, shown generally at 40, of the x-ray window 31 described herein may be attached to a mount 24 and an x-ray detector 42. The x-ray window (or layers) can allow x-rays, represented by 41, to impinge upon the detector 42.

Figure 5:
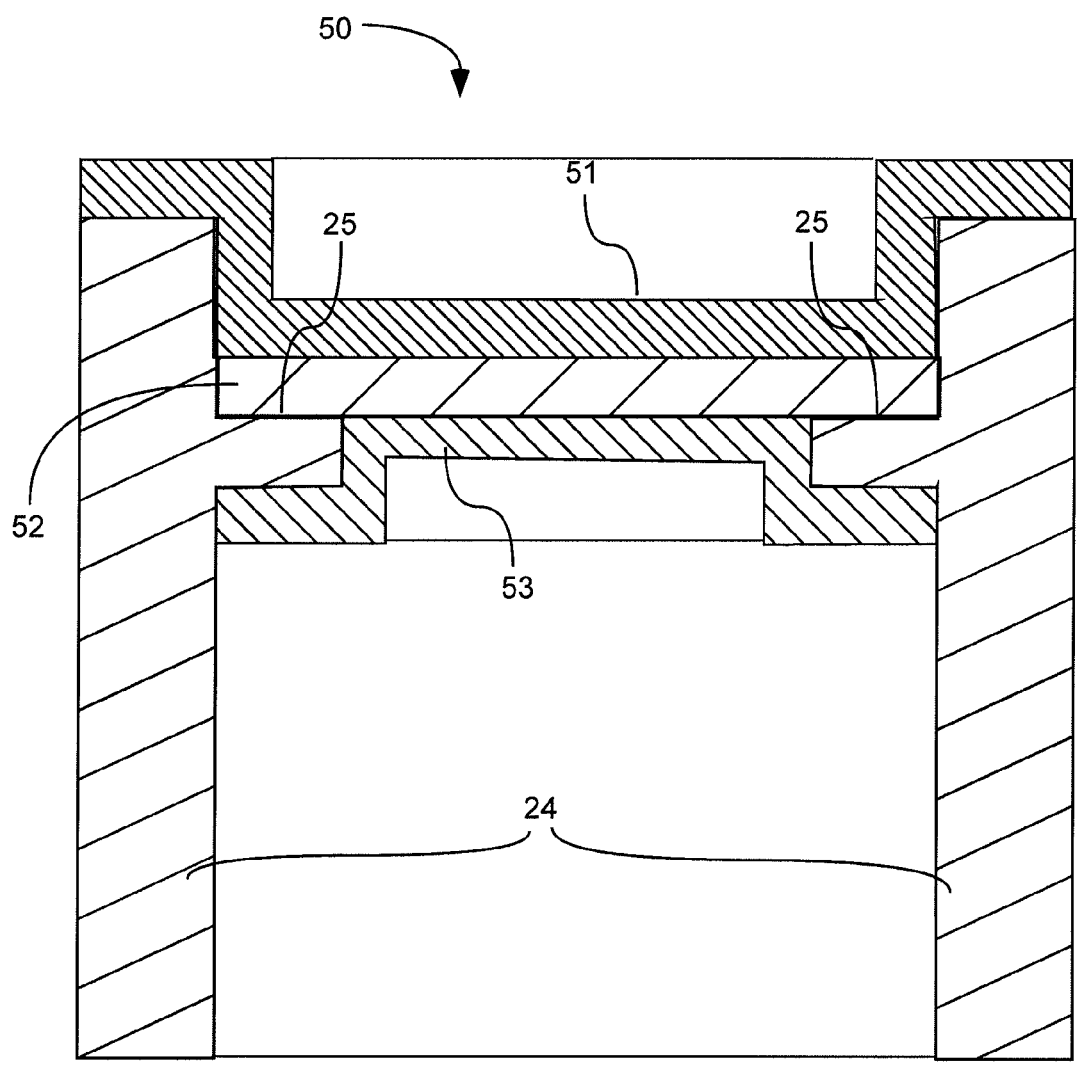
FIG. 5 is a schematic cross-sectional side view of an x-ray window attached to a mount in accordance with an embodiment of the present invention.

As shown in FIG. 5, an x-ray window 50 can comprise a beryllium layer 52 and a polyimide layer 51 disposed over the beryllium layer. The beryllium layer can be hermetically sealed to a mount 24 or the annular flange or lip at a perimeter of the beryllium layer defining a sealed joint 25. The polyimide layer 51 can extend beyond the perimeter of the beryllium layer 52 and onto the mount, and the polyimide layer 51 can provide corrosion protection to the sealed joint 25. The beryllium and polyimide layers can be substantially transmissive to x-rays having an energy in the range of 100-20,000 electronvolts, and can be capable of withstanding a differential pressure of at least 1 atmosphere and capable of withstanding temperatures of greater than 350° C. A second layer 53 can be disposed on an opposing side of the beryllium layer 52 from the polyimide layer 51. The second layer may be a polymer layer, a polyimide layer, a boron hydride layer or combinations thereof. The second layer 53 can extend beyond the perimeter of the beryllium layer 52 and onto the mount, and can provide corrosion protection to the sealed joint 25.

In one embodiment, the beryllium layer 52 has a thickness of about 5 to 500 micrometers and the polyimide layer 51 has a thickness of about 50 to 1200 nanometers. In another embodiment, the beryllium layer 52 has a thickness of about 5 to 12 micrometers and the polyimide layer 51 has a thickness of about 20 to 300 nanometers. In another embodiment, the beryllium layer 52 has a thickness of about 50 to 1200 nanometers and the polyimide layer 51 has a thickness of about 50 to 1200 nanometers.

Layers may be made by chemical vapor deposition, spin-on, or spray on.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. An x-ray window comprising a plurality of layers stacked together, including:
    a) a thin film layer comprising a material selected from the group consisting of diamond, graphene, diamond-like carbon, beryllium, and combinations thereof;
    b) a boron hydride layer;
    c) a polymer layer; and
    d) wherein the boron hydride layer is disposed between the thin film layer and the polymer layer.

2. The x-ray window of claim 1, wherein the plurality of layers are substantially transmissive to x-rays having an energy in the range of 100-20,000 electronvolts.

3. The x-ray window of claim 1, wherein the polymer layer comprises a polyimide.

4. The x-ray window of claim 1, wherein:
    a) the thin film layer has a thickness of about 5 to 500 micrometers;
    b) the boron hydride layer has a thickness of about 20 to 2000 nanometers; and
    c) the polymer layer has a thickness of about 50 to 1200 nanometers.

5. The x-ray window of claim 1, wherein:
    a) the thin film layer has a thickness of about 5 to 12 micrometers;
    b) the boron hydride layer has a thickness of about 800 to 1600 nanometers; and
    c) the polymer layer has a thickness of about 20 to 300 nanometers.

6. The x-ray window of claim 1, wherein:
   a) the thin film layer has a thickness of about 50 to 1200 nanometers;
   b) the boron hydride layer has a thickness of about 20 to 2000 nanometers; and
   c) the polymer layer has a thickness of about 50 to 1200 nanometers.

7. The x-ray window of claim 1, further comprising a mount, and wherein:
   a) the thin film layer is hermetically sealed to the mount at a perimeter of the thin film layer defining a sealed joint;
   b) the boron hydride layer and the polymer layer extend beyond the perimeter of the thin film layer; and
   c) the boron hydride layer and the polymer layer providing corrosion protection to the sealed joint.

8. The x-ray window of claim 7, wherein the boron hydride layer is a first boron hydride layer, and further comprising:
   a) a second boron hydride layer disposed on an opposite side of the thin film layer from the first boron hydride layer;
   b) the second boron hydride layer extending beyond the perimeter of the thin film layer to cover the sealed joint; and
   c) the second boron hydride layer providing corrosion protection to the sealed joint.

9. The x-ray window of claim 7, wherein the polymer layer is a first polymer layer, and further comprising:
   a) a second polymer layer disposed on an opposite side of the thin film layer from the first polymer layer;
   b) the second polymer layer extending beyond the perimeter of the thin film layer to cover the sealed joint; and
   c) the second polymer layer providing corrosion protection to the sealed joint.

10. The x-ray window of claim 7, wherein:
    a) the plurality of layers is capable of withstanding a differential pressure of at least 1 atmosphere; and
    b) the plurality layers is capable of withstand temperatures of greater than 350° C.

11. The x-ray window of claim 7, wherein the thin film layer is hermetically sealed to the mount by diffusion bonding, brazing, or soldering.

12. An x-ray window comprising a plurality of layers stacked together, including:
    a) a thin film layer comprising a material selected from the group consisting of diamond, graphene, diamond-like carbon, beryllium, and combinations thereof, the thin film layer having a thickness of about 50 to 1200 nanometers;
    b) a boron hydride layer having a thickness of about 20 to 2000 nanometers; and
    c) a polymer layer having a thickness of about 50 to 1200 nanometers.

13. The x-ray window of claim 12 further comprising a mount with the thin film layer hermetically sealed thereto at a perimeter of the thin film layer defining a sealed joint, the polymer layer extending beyond the perimeter of the thin film layer, and the polymer layer providing corrosion protection to the sealed joint.

14. The x-ray window of claim 12, wherein the thin film layer is disposed between the boron hydride layer and the polymer layer.

15. An x-ray window comprising:
    a) a plurality of layers stacked together, including:
        i) a thin film layer comprising a material selected from the group consisting of diamond, graphene, diamond-like carbon, beryllium, and combinations thereof;
        ii) a boron hydride layer;
        iii) a first polymer layer and a second polymer layer;
        iv) the first polymer layer disposed on one side of the thin film layer and the second polymer layer disposed on an opposite side of the thin film layer;
    b) a mount;
    c) the thin film layer is hermetically sealed to the mount at a perimeter of the thin film layer defining a sealed joint;
    d) the boron hydride layer, the first polymer layer, and the second polymer layer extend beyond the perimeter of the thin film layer; and
    e) the boron hydride layer, the first polymer layer, and the second polymer layer provide corrosion protection to the sealed joint.

16. The x-ray window of claim 15, wherein the thin film layer is hermetically sealed to the mount by diffusion bonding, brazing, or soldering.

17. The x-ray window of claim 15, wherein the boron hydride layer is a first boron hydride layer, and further comprising:
    a) a second boron hydride layer disposed on an opposite side of the thin film layer from the first boron hydride layer;
    b) the second boron hydride layer extending beyond the perimeter of the thin film layer to cover the sealed joint; and
    c) the second polyimide layer providing corrosion protection to the sealed joint.

18. The x-ray window of claim 15, wherein the thin film layer comprises beryllium and the polymer layer comprises polyimide.

* * * * *